United States Patent
Im

(10) Patent No.: US 7,136,890 B2
(45) Date of Patent: Nov. 14, 2006

(54) INVERSE DISCRETE COSINE TRANSFORM APPARATUS

(75) Inventor: Jin Seok Im, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 558 days.

(21) Appl. No.: 10/321,369

(22) Filed: Dec. 18, 2002

(65) Prior Publication Data

US 2003/0142743 A1    Jul. 31, 2003

(30) Foreign Application Priority Data

Dec. 18, 2001    (KR) .................. 10-2001-0080762

(51) Int. Cl.
*G06F 17/14* (2006.01)
(52) U.S. Cl. ........................... 708/401; 708/402
(58) Field of Classification Search ............ 708/401, 708/402
See application file for complete search history.

(56) References Cited

U.S. PATENT DOCUMENTS 5,420,811 A * 5/1995 Ohki ..................... 708/402
5,590,067 A * 12/1996 Jones et al. ............ 708/401
6,327,602 B1 * 12/2001 Kim ....................... 708/401

* cited by examiner

*Primary Examiner*—Chuong D. Ngo
(74) *Attorney, Agent, or Firm*—Birch, Stewart, Kolasch and Birch, LLP

(57) ABSTRACT

An inverse discrete cosine transform (IDCT) apparatus is disclosed. The inverse discrete cosine transform (IDCT) apparatus can satisfy the bit accuracy of the standard recommendation and enable implementation of the ASIC by a smaller logic circuit, and simplify an interface between another sections of a video decoder. According to the present invention the image recovering performance of the video decoder installed to a digital TV receiver can be enhanced.

8 Claims, 6 Drawing Sheets

INVERSE DISCRETE COSINE TRANSFORM APPARATUS

This application claims the benefit of the Korean Application No. P 2001-80762 filed on Dec. 18, 2001, which is hereby incorporated by reference.

BACKGROUND OF THE INVENTION

1. Field of the Invention

The present invention relates to a digital TV receiver, and more particularly, to an inverse discrete cosine transform (IDCT) apparatus.

2. Discussion of the Related Art

Generally, a moving picture experts group (MPEG)-2 specification is used for compression encoding of a digital image of a digital TV. In a basic concept of image compression, discrete cosine transform (DCT) and quantization are used to remove spatial redundancy. Also, a motion estimation-compensation method is used to remove temporal redundancy. The DCT is a method of removing correlation of spatial data through 2-dimensional orthogonal transform. After dividing an image frame into blocks having a uniform size, which do not overlap, pixels of the respective blocks are converted into a frequency region.

In the MPEG-2 specification, the size of such a DCT block is defined as 8*8 (block). The characteristic of the DCT block converted into the frequency region is that coefficients are mainly distributed in a low frequency region. This means that it is possible to compress data to be encoded by appropriate quantization and run-level coding of the DCT coefficients.

Therefore, in the digital TV receiver, an original image is recovered through performing of motion compensation, inverse quantization, and IDCT using motion vectors and DCT coefficients transmitted from a transmitter.

FIG. 1 is a block diagram illustrating a structure of a video decoder of a common digital TV receiver for recovering a video stream.

The function of the video decoder as shown in FIG. 1 is divided into the decompression with respect to the temporal compression and the recover with respect to space compress. The recover for the time compress is a portion performing the motion estimation-compensation by using a motion vector outputted from a variable length decoder (hereinafter refer to "VLD") 101. The decompression for the spatial compression is a portion performing the IDCT after performing the inverse scan and the inverse quantization by using the DCT coefficient and the quantization value outputted from the VLD 101.

By referring to FIG. 1, a transmitted video bit stream is variable length decoded by a VLD 101 and is divided into the motion vectors, the quantization values, and the DCT coefficients. The quantization values and the DCT coefficients are outputted to an inverse scanner/inverse quantizer (IS/IQ) 102. The motion vectors are outputted to a motion compensation section 105.

The IS/IQ 102 uses a zigzag scan manner or an alternate scan. The IS/IQ 102 performs an inverse scan of inputted DCT coefficients in a raster scan manner, performs an inverse quantization of the inversely scanned DCT coefficients according to the quantization values, and outputs the inversely quantized DCT coefficients to an IDCT apparatus 104 through a coefficient buffer 103.

The IDCT apparatus 104 performs an inverse discrete cosine transform (herein after refer to 'IDCT') of the inversely quantized DCT coefficients, and outputs the DCT coefficients to an MB adder 107. A value outputted from the IDCT apparatus 104 to the MB adder 107 is a difference value between the pixels of the prior block and the pixels of present block.

The motion compensation section 105 performs motion compensation of the current pixel value using the motion vector and a previous frame pre-stored in a frame memory 100, and outputs the current pixel value to the MB adder 107 through a prediction buffer 106. At that time, the output value from prediction buffer 106 to the MB adder 107 is a compensated value for the present pixel.

The MB adder 107 adds the inverse discrete cosine transformed result value to the motion compensated result value in the unit of macro block and outputs the same. Thus, a recovered complete image corresponding to the final pixel value is outputted to a display device, and is stored in the frame memory 100 through a storage buffer 108 for motion compensation for the next block pixels. Here, the frame memory 100 has a storage capacity as the unit of frame.

At this time, a 54 MHz clock is used as a overall operation clock of the video decoder of FIG. 1 for high-speed image recovery of the digital TV receiver excluding the IDCT apparatus 104. In the video decoder, image recovery is consisted of the unit of macro blocks and the recovering process of data is basically performed in the unit of four pixels and four coefficients. However, regardless of following detailed description, the IDCT apparatus 104 performs the IDCT in a eight-coefficient unit.

The IDCT of the IDCT device will be described in detail as follow.

The IDCT apparatus 104 mainly performs 2-dimensional IDCT of the inputted DCT coefficients. The IDCT is a main factor of affecting image recovering performance of the digital TV set.

However, in the 2-dimensional IDCT, a plurality of mathematical operations should be performed.

The 2-dimensional IDCT performs 1-dimensional IDCT with respect to a column, transposes the column, and then also performs 1-dimensional IDCT with respect to a row.

The following equation 1 is a matrix expression of 2-dimensional IDCT.

$$Z = A^T X A \qquad \text{[Equation 1]}$$

The equation 1 illustrates the 2-dimensional IDCT. In the equation 1, if "$A^T X$" is transposed into "Y", the equation 1 comes to "$Z=YA=(A^T Y^T)^T$". then if the 2-dimensional IDCT is divided into 1-dimensional IDCT respectively, each 1-dimensional IDCT is illustrated as shown below.

Column IDCT(1-dimension): $Y = A^T X$

Row IDCT(1-dimension): $Z = (A^T Y^T)^T$

In the equation 1, A is a cosine constant matrix and $A^T$ is a transpose matrix of the cosine constant matrix.

Return to the description of the 2-dimensional IDCT, the 2-dimensional IDCT is performed by performing the 1-dimensional IDCT using the transpose matrix($A^T$) of a cosine constant for a column as illustrated in the Equation 1, transposing the result of the above-performed 1-dimensional IDCT, and is completed by performing the 1-dimensional IDCT on a row. At this time, the matrix expression of the IDCT is divided into an even matrix and an odd matrix by using orthogonality and symmetry of the transpose matrix of the cosine constant.

The following Equation 2 represents a cosine constant value. The equation 3 illustrates the 1-dimensional IDCT represented by the even matrix and the odd matrix.

$$[abcdefg] = \left[\cos\frac{\pi}{4} \cos\frac{\pi}{16} \cos\frac{\pi}{8} \cos\frac{3\pi}{16} \cos\frac{5\pi}{16} \cos\frac{3\pi}{8} \cos 7\frac{\pi}{16}\right] \quad \text{[Equation 2]}$$

$$\begin{bmatrix} Y(0), Y(7) \\ Y(1), Y(6) \\ Y(2), Y(5) \\ Y(3), Y(4) \end{bmatrix} = \frac{1}{2}\begin{bmatrix} a & c & a & f \\ a & f & -a & -c \\ a & -f & -a & c \\ a & -c & a & -f \end{bmatrix}\begin{bmatrix} X(o) \\ X(2) \\ X(4) \\ X(6) \end{bmatrix} \pm \quad \text{[Equation 3]}$$

$$\frac{1}{2}\begin{bmatrix} b & d & e & g \\ d & -g & -b & -e \\ e & -b & g & d \\ g & -e & d & -b \end{bmatrix}\begin{bmatrix} X(1) \\ X(3) \\ X(5) \\ X(7) \end{bmatrix}$$

As descibed above, the IDCT appartaus 104 for the 1-dimensional IDCT represented by the multiplication of the even matrix by the odd matrix simultaneously receives eight coefficients as inputs and performs the corresponding multiplication.

Therefore, the IDCT apparatus 104 used in a conventional video decoder has a plurality of multiplexers that are arranged in parallel through various stages in order to satisfy a digital TV image recovery performance.

At this time, an algorithm for fast calculation of a multiplexer may be used. A Booth algorithm or an improved radix-2 multi-bit coding algorithm may be used.

If the IDCT apparatus 104 as described in FIG. 1 supports a high-speed IDCT, the IDCT apparatus 104 operates in 50 MHz and can perform up to a performance of 400M samples/sec. However, for the operation of the high-speed IDCT, the size of a circuit is very large.

However, since the performance of the IDCT apparatus satisfying the performance of the digital TV receiver is enough when it is 200M samples/sec, in the conventional video decoder mounted in the digital TV receiver, 27 MHz as an operation clock of the IDCT apparatus is used. Then, it is possible to obtain 216 sample rate Like this, in the event of using 27 MHz as the operation clock of the IDCT apparatus, the size of the logic circuit necessary to obtain the required sample/sec is reduced.

However, there are still problems to satisfy the digital TV receiver image recovery performance by the IDCT apparatus operated by 27 MHz.

The problem is that a section 202 for performing the IDCT receives and processes data inputted in the unit of eight coefficients.

Therefore, as shown in FIG. 2, the IDCT apparatus installed inside the conventional video decoder must demultiplex four data items by eight data items in an input and must multiplex eight data items by four data items in an output using a demultiplexer 201 and a multiplexer 203 again. Here, the demultiplexer 201 demultiplexes the four data to be inputted into eight data, while the multiplexer 203 multiplxes the eight data to be outputted into four, data.

FIG. 3 illustrates a timing chart of the demultiplexer 201 for controlling the input of an IDCT section 202. FIG. 4 illustrates a timing chart of the multiplexer 203 for controlling the output of the IDCT section 202.

By referring FIGS. 2 and 3, coefficient data items c_d0 to c_d3 inputted to the demultiplexer 201 by an overall operation clock vdclk of the apparatus are demultiplexed to eight data x0 to x7 by the clock idctclk of the IDCT section 202.

By referring FIGS. 2 and 4, the pixel values z0 to z7 outputted from the IDCT section 202 by the clock idctclk of the IDCT section 202 are multiplexed to four pixel data items I_d0 to I_d3 by an overall operation clock vdclk. The multiplexed data are outputted to the MB adder 107 as shown in FIG. 1.

Here, the overall operation clock vdclk is 54 MHz and the operation clock idctclk of the IDCT section 202 is 27 MHz.

Summing up, the IDCT apparatus performing the IDCT through the mathematical operation such as equation 3 in the conventional video decoder simultaneously receives eight inputs using the demultiplexer 201, performs the multiplication operations of the even matrix and the odd matrix, and outputs eight inverse discrete cosine transformed pixels every clock through the multiplexer 203 in order to satisfy the required performance of the digital TV receiver.

As described above, by the addition of the demultiplexer and the multiplexer to the IDCT apparatus causes an amount of logic to significantly increase in implementing the circuit. Also, as the IDCT apparatus uses the operation clock different from operation clock of another sections of the overall video decoder, timing control must be performed, while paying much attention to an interface with the IDCT apparatus and another sections. Further, there is a need of a further clock generator.

The IDCT apparatus of the conventional video decoder has disadvantages that multiplier is increased according to the processing of eight coefficients and a logic circuit is increased in implementing an ASIC as unnecessary multiplexer and demultiplexer are added.

SUMMARY OF THE INVENTION

Accordingly, the present invention is directed to an inverse discrete cosine transform apparatus that substantially obviates one or more problems due to limitations and disadvantages of the related art.

An object of the present invention is to provide an inverse discrete cosine transform (IDCT) apparatus, which can satisfy the bit accuracy of the standard recommendation and enable implementation of the ASIC by a smaller logic circuit.

Another object of the present invention is to provide an inverse discrete cosine transform IDCT apparatus capable of simplifying an interface between another sections of a video decoder. Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. To achieve the object and other advantages and in accordance with the purpose of the invention, as embodied and broadly described herein, an inverse discrete cosine transform (IDCT) apparatus used to decode received data, including a column 1-dimensional IDCT for performing 1-dimensional inverse discrete cosine transformation (IDCT) for a discrete cosine transform coefficient inputted in the unit of two clocks in a column direction inputted and outputting the result in a unit of two clocks, a transpose matrix section for transposing the transformed result of the column 1-dimensional IDCT section, and a row 1-dimensional IDCT section for performing 1-dimensional inverse discrete cosine transformation (IDCT) for the output of the transpose matrix section in a row direction.

According to a feature of the present invention, the IDCT apparatus further including a first accumulator for storing a first clock data outputted from the column 1-dimensional IDCT section, accumulating a second clock data outputted from the column 1-dimensional IDCT section and outputting the accumulated data to the transpose matrix section and a second accumulator for storing a first clock data outputted from the row 1-dimensional IDCT section, accumulating a second clock data outputted from the row 1-dimensional IDCT section and outputting a final result of the IDCT apparatus.

The transpose matrix section stores data inputted once by every two clock from the first accumulator in a unit of a block, transposes a column and row for the stores data of the block size, and outputs the transposed result according to an arrangement required to the row 1-dimensional IDCT section.

The transpose matrix section outputs the transposed result in a unit of four data items every clock according to the arrangement required the row 1-dimensional IDCT section.

The first and the second accumulators perform rounding of bit corresponding to decimal below places unaffecting some accuracy for own accumulated result.

More preferably, an output range of the final result of the second accumulator is restricted in order not to escape a transform range of the IDCT apparatus.

The column 1-dimensional IDCT section separates the inputted discrete cosine transform (DCT) coefficients in a unit of two clocks into an even matrix and an odd matrix by using an orthogonality and a symmetry characteristic of the transpose matrix of a cosine constant, divides the separated even matrix and odd matrix into a first multiplying part and a second multiplying part, and sequentially performs operations by the first multiplying part and the second multiplying part. The column 1-dimensional IDCT section performs a multiplexing operation for a same cosine constant by sharing a multiplier internally installed multiplier.

The row 1-dimensional IDCT section separates the inputted data in a row direction every two clocks from the transpose matrix section by using an orthogonality and a symmetry of the transpose matrix of a cosine constant into an even matrix and an odd matrix, divides the separated even and odd matrixes into a first multiplying part and a second multiplying part, and sequentially performs operations by the first multiplying part and the second multiplying part. Especially, the row 1-dimensional IDCT section performs a multiplexing operation for a same cosine constant by sharing a multiplier internally installed multiplier.

The IDCT apparatus is mounted to a video decoder for decoding an inputted video data and operated is at a same clock with the video decoder.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. The present invention now will be described more fully with reference to the accompanying drawings, in which preferred embodiments of the invention are shown. This invention may, however, be embodied in many different forms and should not be construed as being limited to the embodiments set forth herein.

Figure 2:
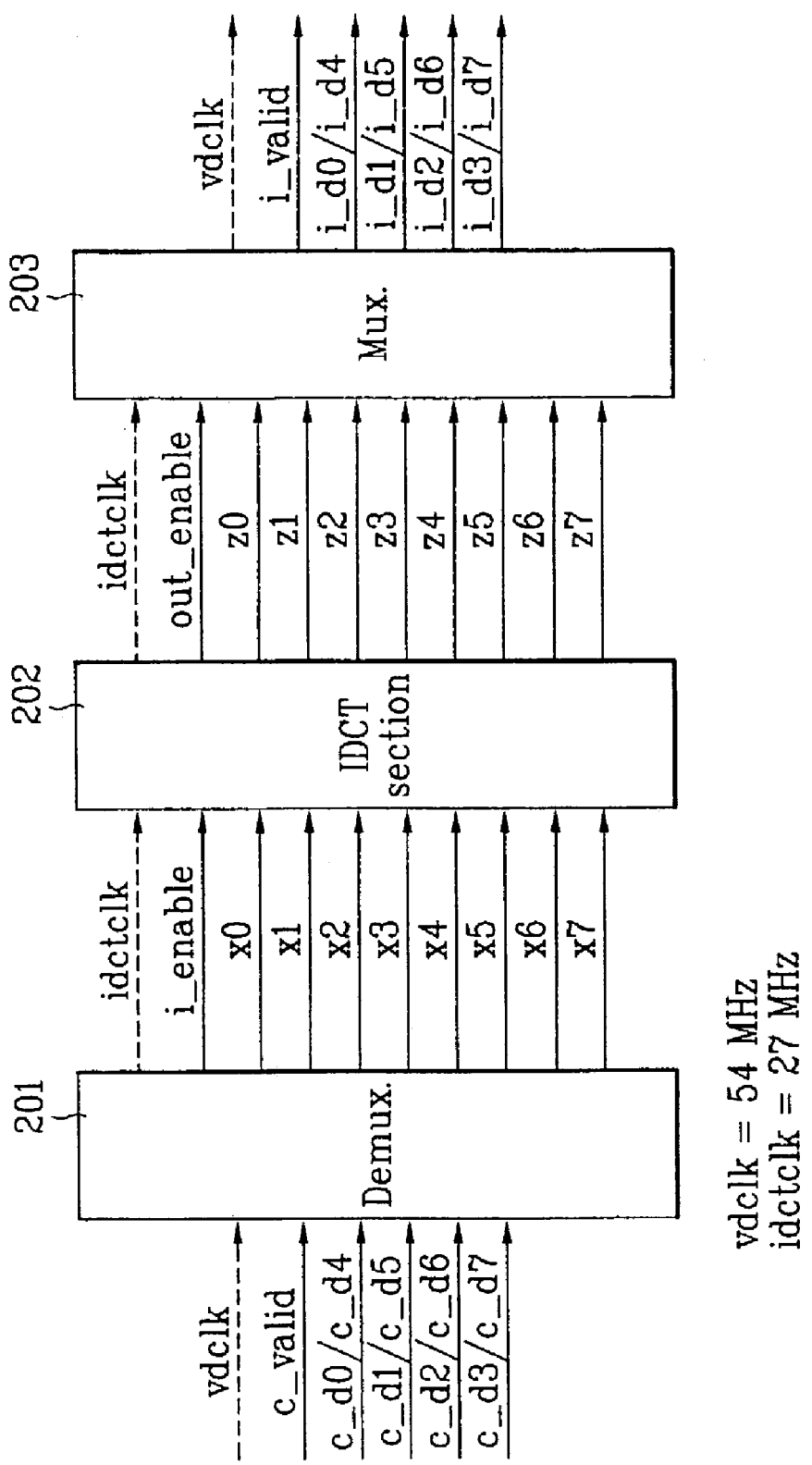
FIG. 2 is a schematic view of a conventional inverse discrete cosine transform (IDCT) apparatus.
Figure 3:
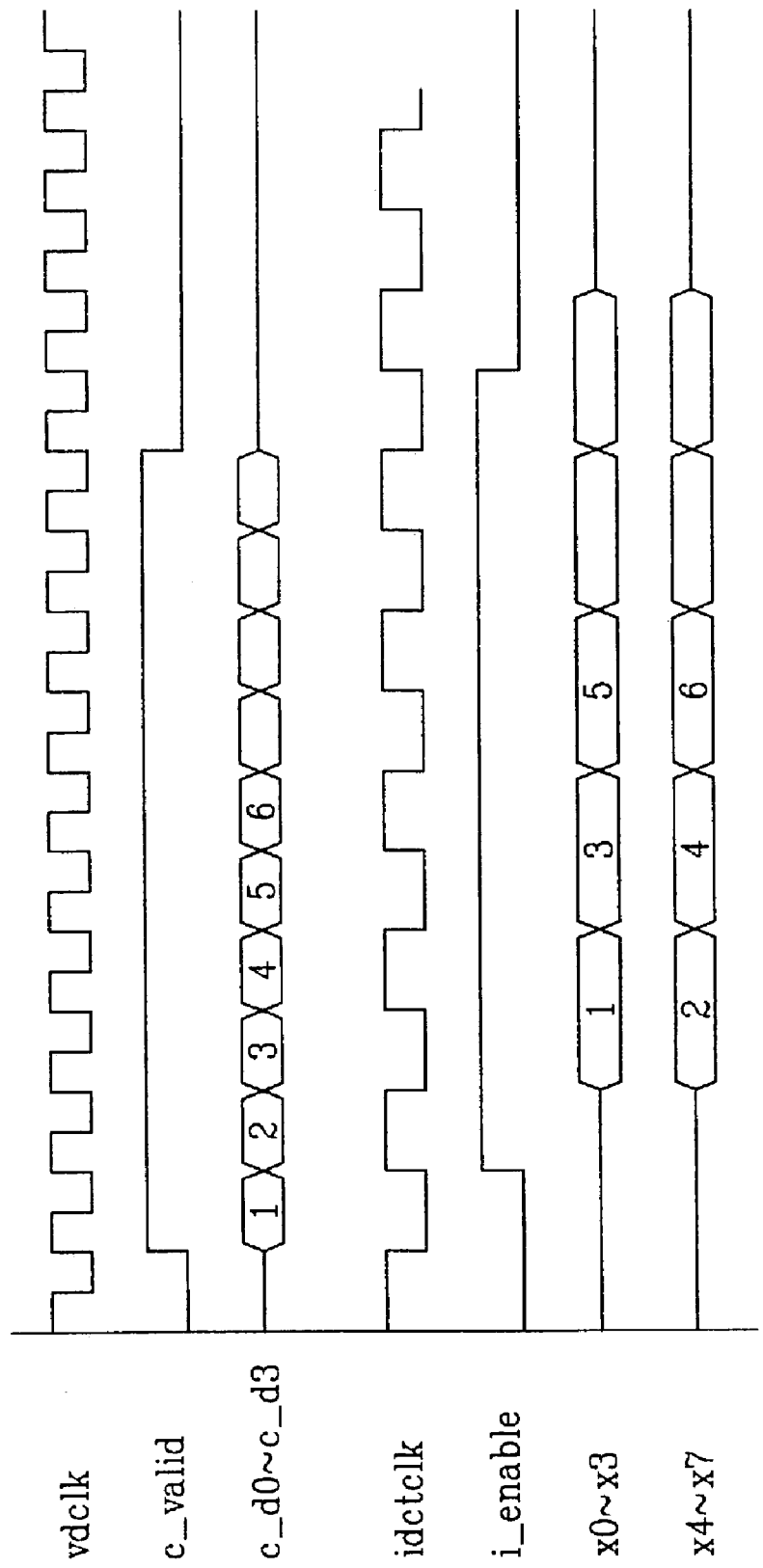
FIG. 3 is a timing diagram of the demultiplexer of FIG. 2.
Figure 4:
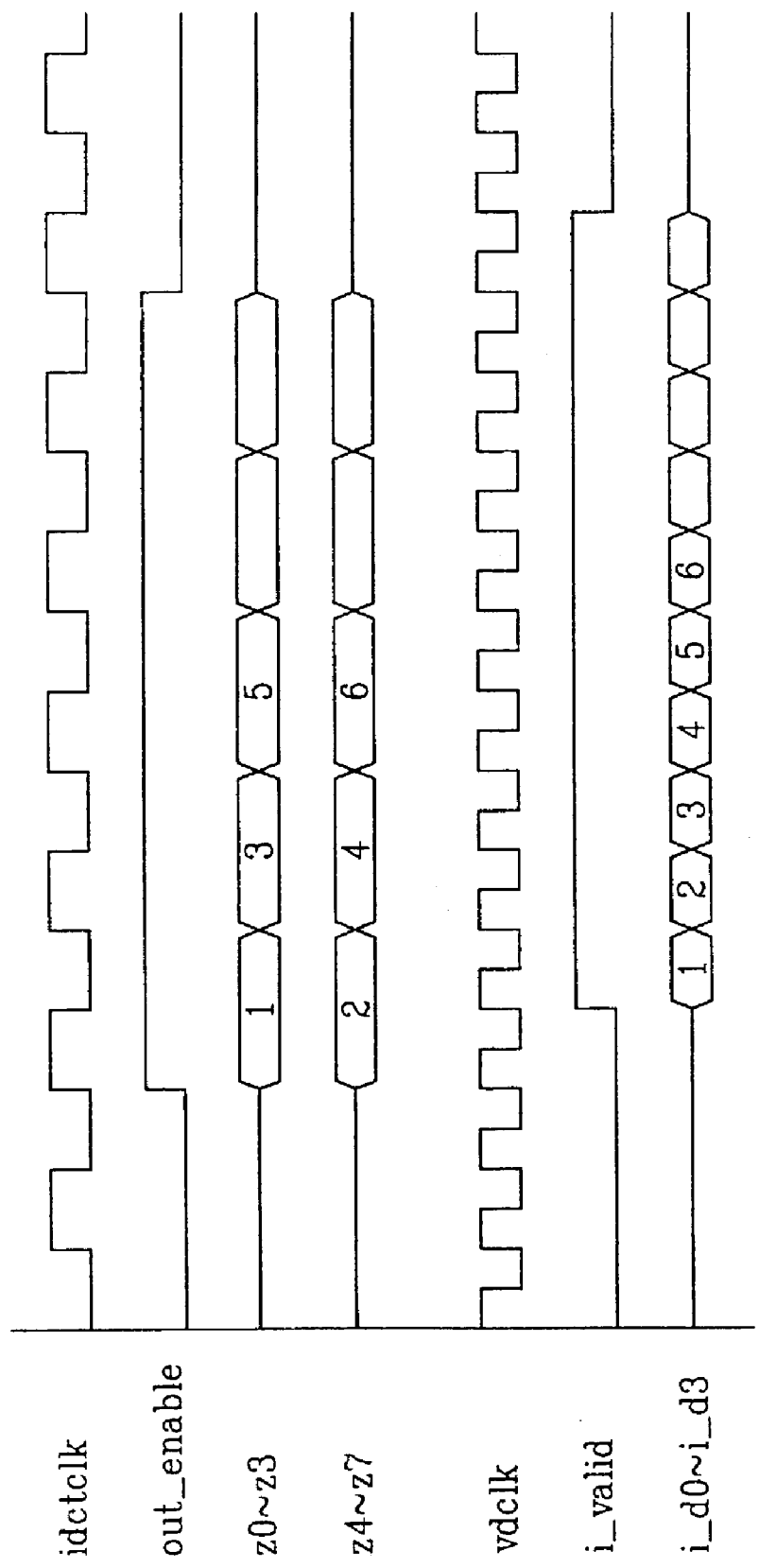
FIG. 4 is a timing diagram of the multiplexer of FIG. 2.

An inverse discrete cosine transform (IDCT) apparatus according to the present invention is aimed at reducing the number of multipliers installed in the IDCT apparatus rather than increasing a speed of calculation of a multiplier. Also, the demultiplexer and the multiplexer as illustrated in FIG. 2 are not used. That is, the IDCT apparatus of the present invention has an output satisfying the image recovering performance of a digital TV receive while being operated in the same clock as an overall video decoder. Therefore, it is possible to remove the demultiplexer and the multiplexer.

The IDCT apparatus according to the present invention is implemented by which 2-dimensional IDCT is performed in twice 1-dimensional IDCT twice by a row-column separation method. That is, a method that the 1-dimensional IDCT is performed for a row again after transporting column performed in the 1-dimensional IDCT is basically used.

Figure 5:
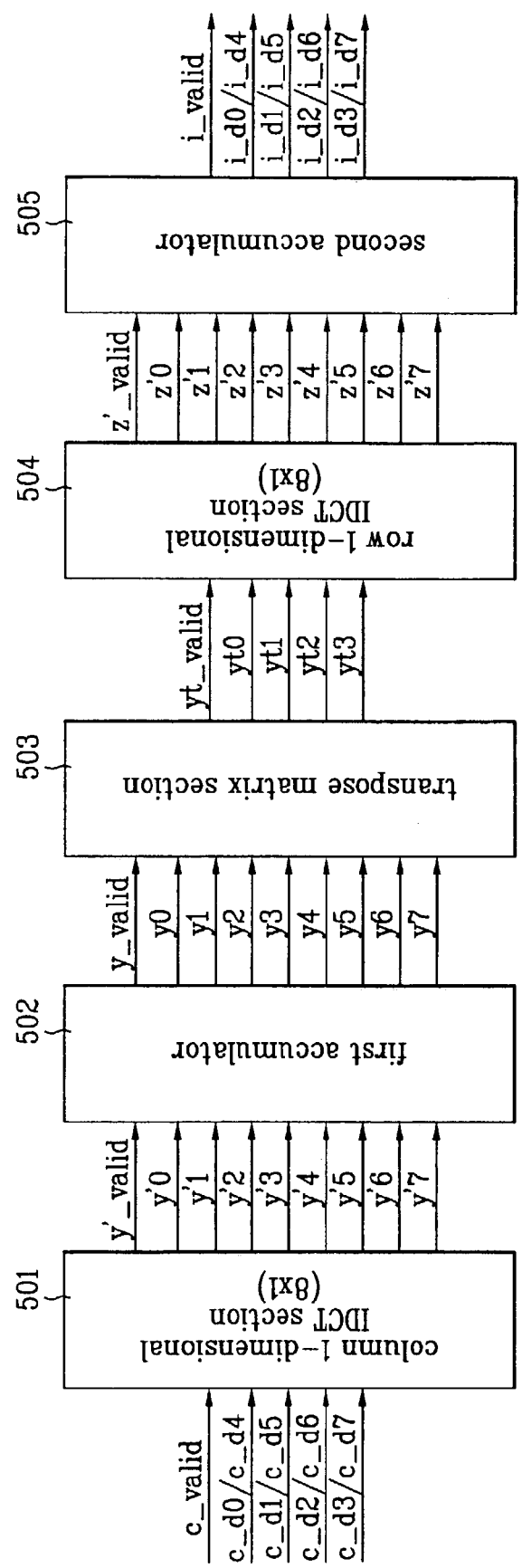
FIG. 5 is a block diagram of an IDCT apparatus according to the present invention.

FIG. 5 is a block diagram of a structure of the IDCT apparatus according to the present invention which includes two 1-dimensional IDCT sections 501 and 504, two accumulators 502 and 505, and a transpose matrix section 503.

The 1-dimensional IDCT sections 501 and 504 include a column 1-dimensional IDCT section 501 performing 1-dimensional IDCT for a column and a row 1-dimensional IDCT section 504 performing 1-dimensional IDCT for row.

The respective 1-dimensional IDCT sections 501 and 504 include accumulators 502 and 505 at output terminals thereof.

The description of the respective components follows as below.

The column 1-dimensional IDCT section 501 receives eight data corresponding one column according to the arrangement requested by the IDCT. The eight data are inputted over two clocks so that 1-dimensional IDCT is performed in column direction.

A first accumulator 502 accumulates the outputs of the column 1-dimensional IDCT section 501.

A transpose matrix section 503 transposes a column and a row for the outputs of the first accumulator 502.

The row 1-dimensional IDCT section 504 performs the 1-dimensional IDCT in a row direction for the outputs of the transpose matrix section 503.

A second accumulator 505 accumulates the outputs of the row 1-dimensional IDCT section 504.

Circuits must be significantly reduced in order that the IDCT apparatus of the present invention is operated at a 54 MHz clock that is a reference operation clock of a video decoder. This is caused by a basic principle that an operation clock increases when the size of a circuit is reduced.

In order to reduce circuits enough, to thoroughly test a video decoder, and to improve performance, the input of the IDCT apparatus is in the unit of four DCT coefficients according to the present invention. That is, the DCT coefficients are inputted to the column 1-dimensional IDCT section 501 by a unit of four.

Thus the 2-dimensional IDCT apparatus according to the present invention operates in the same clock with another sections of the video decoder and implements the performance 216M sample/sec such as the conventional IDCT apparatus, while the logic circuit is reduced. This is enough to satisfy the image recovering performance of the digital TV receiver.

Figure 1:
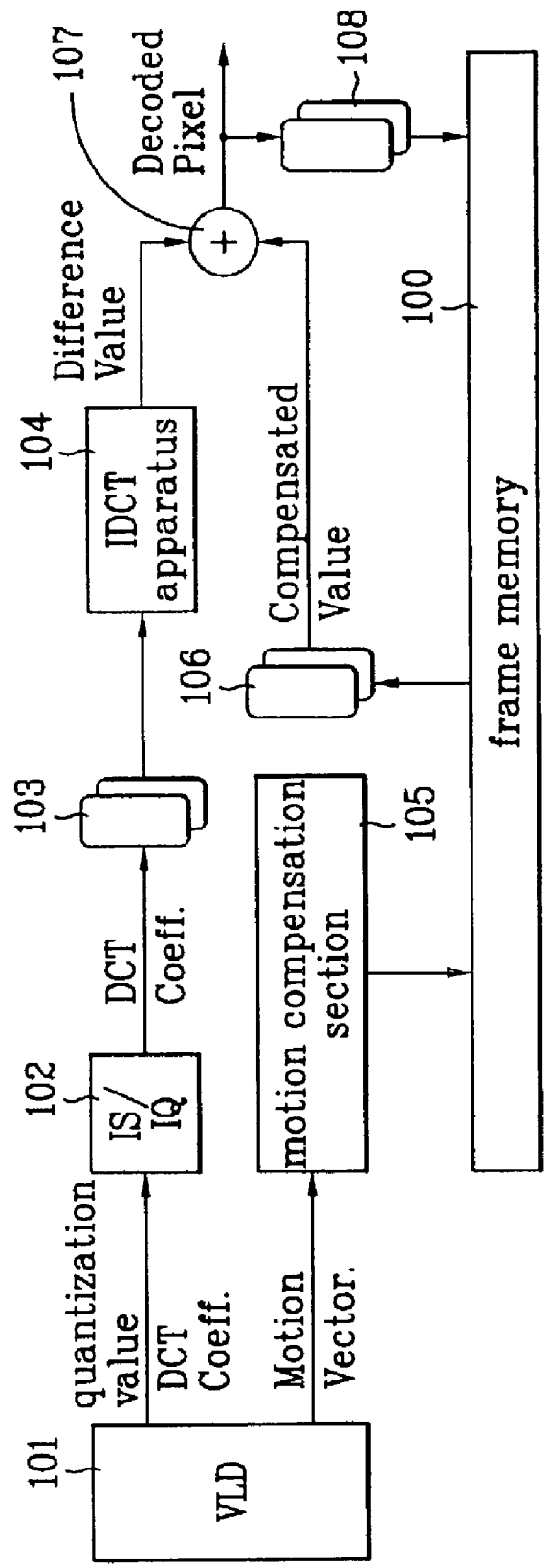
FIG. 1 is a block diagram of a video decoder of a general digital TV receiver.

The IDCT apparatus according to the present invention is installed in the video decoder as shown in FIG. 1. Therefore, another sections of the video decoder except for the IDCT apparatus are applied to the present invention as it is. Hereinafter, since the operation of the IDCT apparatus of the present invention is described in detail in association with another sections of the video decoder, FIG. 1 is also referred.

A column 1-dimensional IDCT section 501 receives an effective signal c_valid and four data c_d0 to c_d3 per clock are inputted from a coefficient buffer 103.

That is, eight (8*1) data items with four data per clock inputs corresponding to one column over two clocks are inputted to the column 1-dimensional IDCT section 501 according to the arrangement requested by the IDCT. Therefore, the column 1-dimensional IDCT section 501 receives and processes data of an 8*8 block as an image recovering unit over a total of 16 clocks.

The outputs of the column 1-dimensional IDCT section 501 are accumulated in a first accumulator 502. That is, an effective signal y'_valid signal outputted from the column 1-dimensional IDCT section 501 as well as and eight data y'0 to y'7 as sum of four data as a result by primary multiplication and four data as a result by secondary multiplication are summed by the first accumulator 502 over two clocks.

At that time, the first accumulator 502 rounds the accumulated result at an appropriate bit. It is to satisfy bit accuracy and to reduce circuits. After that, the first accumulator 502 outputs eight data being 1-dimensional inverse discrete cosine transformed for column to the transpose matrix section 503 every two clocks.

The transpose matrix section 503 transposes the 1-dimensional inverse discrete transformed result for column by macro block unit prior to performing the 1-dimensional IDCT for row.

Therefore, the row 1-dimensional IDCT section 504 like the column 1-dimensional IDCT section 501 receives four data. For this, the transpose matrix section 503 stores a signal y_valid and output data y0 to y7 of the first accumulator 502 in a multiplexed flip-flop once every two clocks. When all the 1-dimensional IDCT result of the 8*8 block (block) are stored, the transpose is performed and the transposed result is outputted in the unit of four data items according to the arrangement requested by the row 1-dimensional IDCT section 504.

The row 1-dimensional IDCT section 504 performing the 1-dimensional IDCT for row has the same structure as that of the column 1-dimensional IDCT section 501.

The IDCT apparatus performing the 2-dimensional IDCT according to the row-column separation method completes 2-dimensional IDCT by further performing the 1-dimensional IDCT for row for the data transposed after column 1-dimensional IDCT. Accordingly, two 1-dimensional IDCT sections 501 and 504 of the same structure are used.

The effective signal z'_valid outputted from the row 1-dimensional IDCT 504 and eight data items z'0 to z'7 are accumulated by the second accumulator 505 over two clocks.

The second accumulator 505 accumulates the results of primary and secondary multiplications over two clocks like the first accumulator 502 and rounds the accumulated result into appropriate bit so as to satisfy the bit accuracy for the final output. At this time, an inverse discrete cosine transformed pixel value or difference value is restricted to a range between −256 and 255.

Therefore, the second accumulator 505 performs pixel level suppression so as not to be deviated from the above-described IDCT range.

The first accumulator 502 and the second accumulator 505 accumulate the 1-dimensional inverse discrete cosine transformed result and round bits corresponding to a decimal place, which do not affect the bit accuracy.

The number of data required for operations inside the IDCT apparatus according to the present invention is related to the area of a logic circuit as well as the efficiency of overall operations. Therefore, it is possible to prevent the deterioration of the performance of the IDCT apparatus when unnecessary data bits are rounded through payment of much attention.

As the result of the 2-dimensional IDCT, an effective signal i_valid and four data i_d0 to i_d3 are outputted to the MB adder 107.

A detailed operation of the column 1-dimensional IDCT section 501 will now be described.

The column 1-dimensional IDCT section 501 included in the IDCT apparatus according to the present invention further divides and processes the matrix expressions of the 1-dimensional IDCT divided into the even matrix and the odd matrix into a first multiplying part and a second multiplying part in order to implement the IDCT apparatus provided in the present invention.

The first bracket of the Equation 4 is a primary multiplication part. The second bracket is a secondary multiplication part.

$$\begin{bmatrix} Y(0), Y(7) \\ Y(1), Y(6) \\ Y(2), Y(5) \\ Y(3), Y(4) \end{bmatrix} = \left( \frac{1}{2} \begin{bmatrix} a & f \\ a & -c \\ a & c \\ a & -f \end{bmatrix} \begin{bmatrix} X(0) \\ X(6) \end{bmatrix} \pm \frac{1}{2} \begin{bmatrix} b & g \\ d & -e \\ e & d \\ g & -b \end{bmatrix} \begin{bmatrix} X(1) \\ X(7) \end{bmatrix} \right) + $$

$$\left( \frac{1}{2} \begin{bmatrix} a & c \\ -a & f \\ -a & -f \\ a & -c \end{bmatrix} \begin{bmatrix} X(4) \\ X(2) \end{bmatrix} \pm \frac{1}{2} \begin{bmatrix} e & d \\ -b & -g \\ g & -b \\ d & -e \end{bmatrix} \begin{bmatrix} X(5) \\ X(3) \end{bmatrix} \right)$$

[Equation 4]

The primary and secondary multiplication parts have a multiplier for the same number of cosine constant. Therefore, when multiplications are performed twice such as a multiplication by the primary multiplication part and a multiplication by the secondary multiplication part, it is possible to share the multiplier for the same cosine constant. In the case of primary multiplication, inputs are "x0, x1, x6, and x7". In the case of secondary multiplication, inputs are "x2, x3, x4, and x5".

Rearrangement for input data inputted into the column 1-dimensional IDCT section 501 generates respective addresses appropriately when writing or reading the coefficient buffer 103. Accordingly, rearrangement for the input data can be simply without adding a logic circuit. The result of the 1-dimensional IDCT for one column is obtained by the accumulations of the primary and secondary multiplication parts.

The number of multipliers that can be shared by the primary and secondary multiplication parts is eleven as illustrated in the following Equation 5.

The multipliers sla, slb, . . . , and slk as illustrated in FIG. 5 are multipliers having eleven different cosine constants. After all, the 1-diemsional IDCT is performed by using only eleven multipliers. That is a essential feature of the present invention.

That is, the primary and secondary multiplication parts perform twice multiplications and share eleven multipliers using the DCT coefficients inputted to the primary and secondary multiplication parts as multiplicands.

$$sla=a*T(0), slb=f*T(1), slc=c*T(1), \quad \text{[Equation 5]}$$

$$sld=b \times T(2), sle=d \times T(2), slf=e \times T(2), slg=g \times T(2),$$

$$slh=g \times T(3), sli=e \times T(3), slj=d \times T(3), slk=b \times T(3)$$

The following Equation 6 illustrates the input DCT coefficients of the respective multipliers and multiplication processes in the primary and secondary multiplication parts.

[Equation 6]

(1) Primary Multiplication Part:

$$T(0)=X(0), T(1)=X(6), T(2)=X(1), T(3)=X(7)$$

$$\begin{bmatrix} V^0(0), V^0(7) \\ V^0(1), V^0(6) \\ V^0(2), V^0(5) \\ V^0(3), V^0(4) \end{bmatrix} = \frac{1}{2}\begin{bmatrix} a & f \\ a & -c \\ a & c \\ a & -f \end{bmatrix}\begin{bmatrix} T(0) \\ T(1) \end{bmatrix} \pm \frac{1}{2}\begin{bmatrix} b & g \\ d & -e \\ e & d \\ g & -b \end{bmatrix}\begin{bmatrix} T(2) \\ T(3) \end{bmatrix} =$$

$$\frac{1}{2}\begin{bmatrix} sla+slb \\ sla-slc \\ sla+slc \\ sla-slb \end{bmatrix} \pm \frac{1}{2}\begin{bmatrix} sld+slh \\ sle-sli \\ slf+slj \\ slg-slk \end{bmatrix} = \frac{1}{2}\begin{bmatrix} s2a \\ s2b \\ s2c \\ s2b \end{bmatrix} \pm \frac{1}{2}\begin{bmatrix} s2e \\ s2f \\ s2g \\ s2h \end{bmatrix}$$

(2) Secondary Multiplication Part:

$$T(0)=X(4), T(1)=X(2), T(2)=X(5), T(3)=X(3)$$

$$\begin{bmatrix} V^1(0), V^1(7) \\ V^1(1), V^1(6) \\ V^1(2), V^1(5) \\ V^1(3), V^1(4) \end{bmatrix} = \frac{1}{2}\begin{bmatrix} a & c \\ -a & f \\ -a & -f \\ a & -c \end{bmatrix}\begin{bmatrix} T(0) \\ T(1) \end{bmatrix} \pm \frac{1}{2}\begin{bmatrix} e & d \\ -b & -g \\ g & -b \\ d & -e \end{bmatrix}\begin{bmatrix} T(2) \\ T(3) \end{bmatrix} =$$

$$\frac{1}{2}\begin{bmatrix} sla+slc \\ -sla+slb \\ -sla-slb \\ sla-slc \end{bmatrix} \pm \frac{1}{2}\begin{bmatrix} slf+slj \\ -sld-slh \\ slg-slk \\ sle-sli \end{bmatrix} = \frac{1}{2}\begin{bmatrix} s2c \\ -s2b \\ -s2a \\ s2d \end{bmatrix} \pm \frac{1}{2}\begin{bmatrix} s2g \\ -s2e \\ s2h \\ s2f \end{bmatrix}$$

At this time, the result of the primary multiplication part of the column 1-dimensional IDCT section 501 is stored by the first accumulator 502 and the stored multiplication result is added to the result of the secondary multiplication part in the next clock. Thus obtained output of the first accumulator 502 is the result of the column 1-dimensional IDCT section 501. That is, the first accumulator 502 obtains the final output by adding the result of (1) the primary multiplication part to the result of (2) the secondary multiplication part of the Equation 6 like in the following Equation 7.

$$\begin{bmatrix} Y(0), Y(7) \\ Y(1), Y(6) \\ Y(2), Y(5) \\ Y(3), Y(4) \end{bmatrix} = \begin{bmatrix} V^0(0), V^0(7) \\ V^0(1), V^0(6) \\ V^0(2), V^0(5) \\ V^0(3), V^0(4) \end{bmatrix} + \begin{bmatrix} V^1(0), V^1(7) \\ V^1(1), V^1(6) \\ V^1(2), V^1(5) \\ V^1(3), V^1(4) \end{bmatrix} \quad \text{[Equation 7]}$$

The row 1-dimensional IDCT section 504 has the same structure as that of the column 1-dimensional IDCT section 501.

Therefore, the column 1-dimensional IDCT section 501 and the row 1-dimensional IDCT section 504 obtain a result of the 1-dimensional IDCT an a manner of accumulating the primary multiplication part and the secondary multiplication part as described above. In other words, the result of the 1-dimensional IDCT for one column or one row is obtained by the accumulations of the primary and secondary multiplication parts.

Summarizing that, each of the 1-dimensional IDCT sections 501 and 504 has the accumulators 502 and 505 at the terminal for summing the final IDCT results. That is, the first accumulator 502 for summing the column IDCT data is provided at the terminal of the column IDCT section 501, and the second accumulator 505 for summing the row IDCT data is provided at the terminal of the row IDCT section 504

The respective accumulators 502 and 505 store enabled outputs of the IDCT sections 501 and 504 in a first clock and accumulate the stored outputs and present outputs in a second clock. That is, the effective results of the accumulators 502 and 505 are outputted once to every two clocks.

The next transpose matrix section 503 outputs eight data items corresponding one row over two clocks according the an arrangement required in the next row 1-dimensional IDCT.

According to installing the IDCT apparatus to a video decoder, the interface between the IDCT apparatus and another sections of the video decoder is closely related to the system performance of the overall video decoder.

A basic control of the video decoder for recovering an encoded image is performed in the unit of macro blocks MB. That is, a previous reference-macro block is read from a memory 100 for motion compensation. The IDCT is performed for the respective blocks of the macro block for the transmitted DCT coefficient. Then, a difference value between previous macro block and present macro block is recovered. Thus, the MB adder 107 creates the macro block of the current recovered image by the previous reference macro block and the recovered difference value.

At this time, according to the present invention, in order to satisfy the decoder performance and the restriction of the logic circuits, the best data transmission unit of the video decoder is basically formed by four pixels. Accordingly, it is helpful to improving the performance of the video decoder in the data transmission unit of the IDCT apparatus by four pixels.

Also, when the operation clock of the video decoder is 54 MHz, the output sample rate of the IDCT apparatus according to the present invention satisfies 216M samples/sec.

Figure 6:
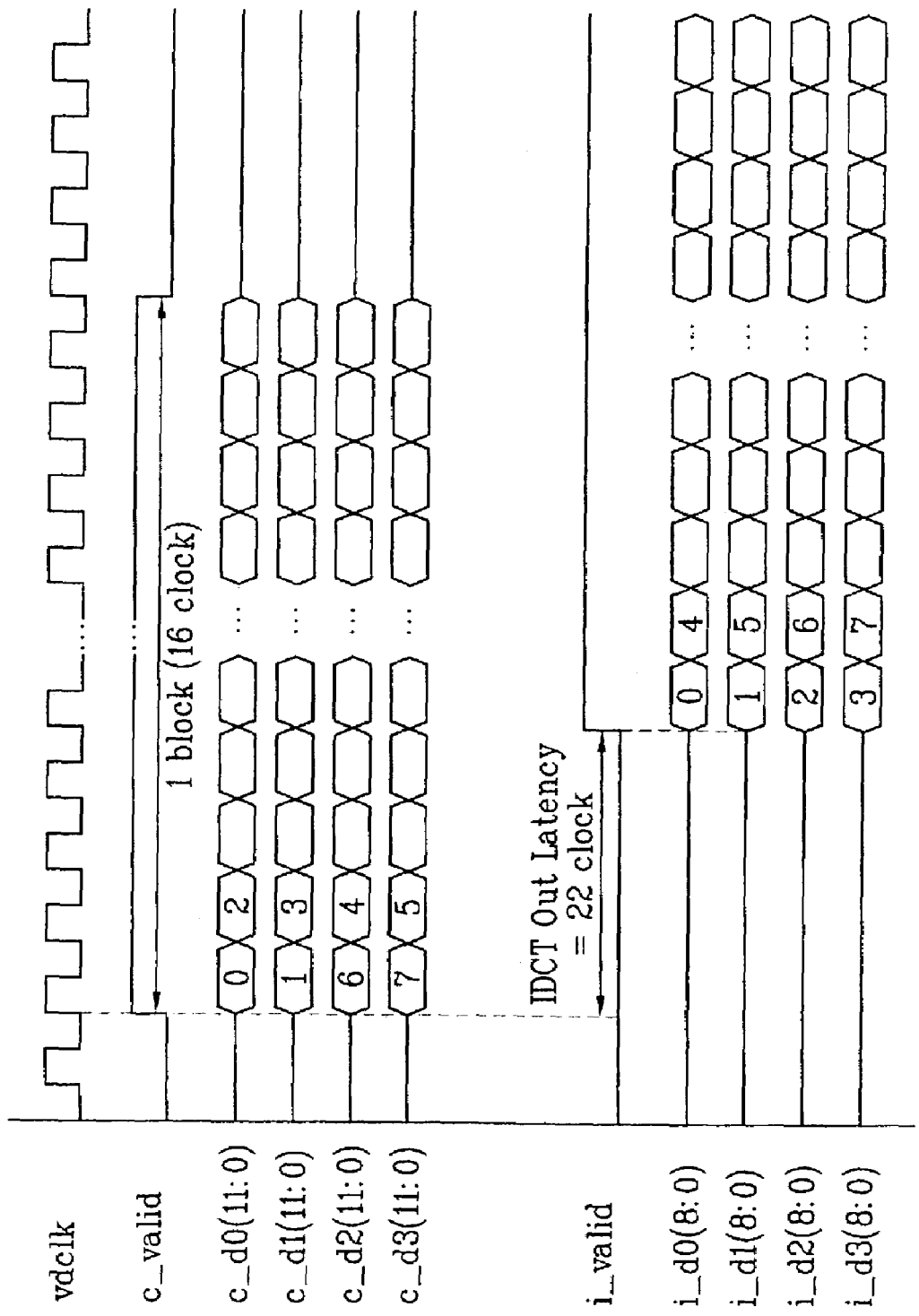
FIG. 6 is a timing diagram of interface of the IDCT apparatus according to the present invention.

FIG. 6 illustrates timing of interface of the IDCT apparatus according to the present invention.

Referring FIG. 6, the input and the output the IDCT apparatus of the present invention are consists of four data units. an IDCT out latency is 22 clocks, which are reduced by 13 clocks than those in the structure of the conventional IDCT apparatus using the conventional multiplexer and demultiplexer.

An input into the IDCT apparatus consists of the unit of four coefficients in a column direction, the output of the IDCT apparatus consists of the unit of four pixels in a row direction so as to be advantageous to the summing of the macro block units. At that time, the arrangement of the IDCT apparatus for the input data is adjusted when data are written to the coefficient buffer 103 or read from the coefficient buffer 103. That is, the arrangement for the input data is adjusted by generating respective addresses appropriately when writing and reading the coefficient buffer 103.

A process of testifying timing for internal circuits in a process of designing an ASIC is essential and very important. Especially, In the case of a system where a plurality of operation clocks exists, it is difficult to testify the timing for internal operational components. Because the provided IDCT apparatus according to the present invention operates in a reference operation clock 54 MHz of the video decoder, the complexity of the ASIC designing process for implementing the conventional IDCT apparatus, more especially the testing process for the timing can be simplified Also, according to the present invention, there is an advantage that the clock generating apparatus required by which the conventional IDCT apparatus uses different operation clock from that of another sections of the video decoder can be removed.

The IDCT apparatus according to the present invention can be implemented by using different algorithms and design technologies according to video decoders.

Therefore, a standard for the correctness of the IDCT resultant value is required. A standardized recommendation, IEEE 1180, becomes such a standard.

Computational bit accuracy of the IDCT apparatus according to the present invention is controlled by the correctness of the decimal point bit of a cosine constant, the correctness of rounding in an intermediate process, and the correctness of a decimal point bit in an accumulator.

According to the present invention, a cosine constant of 14 bits is used as an embodiment. The overall sixteen bits are used as a transposed intermediate value. Four bits are used as a four decimal place.

Also, in the bit accuracy of the data used for the first and second accumulators 502 and 505, seven bits are used as the decimal place.

Accordingly, the computational bit accuracy according to the standard recommendation of the IEEE 1180 is satisfied.

Experimental results are illustrated in Table 1. This experiment compares the final result of the 2-dimensional IDCT by the IDCT apparatus according to the present invention with the result of the 2-dimensional IDCT that becomes a standard and specifies the bit accuracy according to the error.

TABLE 1

| Input pixel range | Peak Error (<1) | Peak Mean Error (<0.015) | Peak Mean Square Error (<0.06) | Overall Mean Error (<0.0015) | Overall Mean Square Error (<0.02) |
| --- | --- | --- | --- | --- | --- |
| −256~255 | 1 | 0.0070 | 0.0154 | 0.0012 | 0.0129 |

TABLE 1-continued

| Input pixel range | Peak Error (<1) | Peak Mean Error (<0.015) | Peak Mean Square Error (<0.06) | Overall Mean Error (<0.0015) | Overall Mean Square Error (<0.02) |
| --- | --- | --- | --- | --- | --- |
| 255~−256 | 1 | 0.0045 | 0.0159 | 0.0010 | 0.0128 |
| −300~300 | 1 | 0.0049 | 0.0148 | 0.0010 | 0.0123 |
| 300~−300 | 1 | 0.0047 | 0.0148 | 0.0010 | 0.0124 |
| −5~5 | 1 | 0.0052 | 0.0066 | 0.0012 | 0.0047 |
| 5~−5 | 1 | 0.0052 | 0.0074 | 0.0011 | 0.0047 |

As mentioned above, according to the IDCT apparatus according to the present invention, since another sections of the overall video decoder and the IDCT apparatus are operated at same clock, the IDCT apparatus has the same interface structure. By the IDCT apparatus of same interface structure with another sections, there appears an effect that the IDCT out latency is reduced. The reduce effect of the IDCT out latency enhances the performance of the digital TV receiver.

Also, since the overall video decoder uses same operation clock by the IDCT apparatus of same interface with the another sections, difficulties in testifying timing necessary and very important to design the ASIC are reduced, while separated clock generator is not required.

According to the present invention, the multiplexer and demultiplexer used in the conventional IDCT apparatus are removed. Also, it is possible to reduce remarkable amount of the logic circuits when implementing circuits by sharing necessary to perform multiplications over twice in each 1-dimensional IDCT.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. In an inverse discrete cosine transform (IDCT) device used to decode received data, the IDCT device comprising:
    a column one-dimensional IDCT for separating input data of a column direction to a primary multiplication matrix and a secondary multiplication matrix, and sharing a multiplier for the same cosine constant so as to sequentially perform a primary multiplication and a secondary multiplication;
    a first accumulator for storing a primary multiplied result of the column one-dimensional IDCT in a first clock, and for adding the stored result and a secondary multiplied result in a second clock, and outputting the added result;
    a transpose matrix section for performing a column-row transposition on the output of the first accumulator;
    a row one-dimensional IDCT for separating data of a row direction outputted from the transpose matrix section to a primary multiplication matrix and a secondary multiplication matrix, and sharing a multiplier for the same cosine constant so as to sequentially perform a primary multiplication and a secondary multiplication; and
    a second accumulator for storing a primary multiplied result of the row one-dimensional IDCT in a first clock, and for adding the stored result and a secondary multiplied result in a second clock, and outputting the added result.

2. The IDCT device of claim 1, wherein the transpose matrix section stores data inputted once by every two clock from the first accumulator in a unit of a block, transposes a column and row for the stores data of the block size, and outputs the transposed result according to an arrangement required to the row one-dimensional IDCT.

3. The IDCT device of claim 1, wherein, when the data inputted to the column one-dimensional IDCT and the row one-dimensional IDCT respectively correspond to x0, x1, x2, x3, x4, x5, x6, and x7, an input rearrangement required for performing the primary multiplication is x0, x1, x6, and x7, and an input rearrangement required for performing the secondary multiplication is x2, x3, x4, and x5.

4. The IDCT device of claim 1, wherein the first and the second accumulators perform rounding of bit corresponding to decimal below places unaffecting a bit accuracy for own accumulated result.

5. The IDCT device of claim 1, wherein an output range of the final result of the second accumulator is restricted in order not to escape a transform range of the IDCT apparatus.

6. The IDCT device of claim 1, wherein the column one-dimensional IDCT and the row one-dimensional IDCT each separates the primary multiplication matrix to an even matrix and an odd matrix by using orthogonality and symmetry characteristics of the transpose matrix of a cosine constant, and wherein the column one-dimensional IDCT and the row one-dimensional I shares a multiplier so as to perform a primary multiplication on the same cosine constant by using the following equation:

$$\begin{bmatrix} V^0(0), V^0(7) \\ V^0(1), V^0(6) \\ V^0(2), V^0(5) \\ V^0(3), V^0(4) \end{bmatrix} = \frac{1}{2}\begin{bmatrix} a & f \\ a & -c \\ a & c \\ a & -f \end{bmatrix}\begin{bmatrix} T(0) \\ T(1) \end{bmatrix} \pm \frac{1}{2}\begin{bmatrix} b & g \\ d & -e \\ e & d \\ g & -b \end{bmatrix}\begin{bmatrix} T(2) \\ T(3) \end{bmatrix} =$$

$$\frac{1}{2}\begin{bmatrix} sla+slb \\ sla-slc \\ sla+slc \\ sla-slb \end{bmatrix} \pm \frac{1}{2}\begin{bmatrix} sld+slh \\ sle-sli \\ slf+slj \\ slg-slk \end{bmatrix} = \frac{1}{2}\begin{bmatrix} s2a \\ s2b \\ s2c \\ s2b \end{bmatrix} \pm \frac{1}{2}\begin{bmatrix} s2e \\ s2f \\ s2g \\ s2h \end{bmatrix}$$

wherein, T(0)=X(0), T(1)=X(6), T(2)=X(1), and T(3)=X(7), and an input order of the primary multiplication is X(0), X(1), X(6), and X(7), wherein the cosine constants a, b, c, d, e, f, and g respectively correspond to the following:

$$[abcdefg] = \left[\cos\frac{\pi}{4}\cos\frac{\pi}{16}\cos\frac{\pi}{8}\cos\frac{3\pi}{16}\cos\frac{5\pi}{16}\cos\frac{3\pi}{8}\cos\frac{7\pi}{16}\right]$$

wherein 11 multipliers sla, slb, . . . , slk that are shared to perform the primary multiplication and the secondary multiplication respectively correspond to multipliers each having a different cosine constant:

$sla=a \times T(0)$, $slb=f \times T(1)$, $slc=c \times T(1)$, $sld=b \times T(2)$, $sle=d \times T(2)$, $slf=e \times T(2)$, $slg=g \times T(2)$, $slh=g \times T(3)$, $sli=e \times T(3)$, $slj=d \times T(3)$, and $slk=b \times T(3)$.

7. The IDCT device of claim 1, wherein the column one-dimensional IDCT and the row one-dimensional IDCT each separates the secondary multiplication matrix to an even matrix and an odd matrix by using orthogonality and symmetry characteristics of the transpose matrix of a cosine constant, and wherein the column one-dimensional IDCT and the row one-dimensional IDCT shares a multiplier so as to perform a secondary multiplication on the same cosine constant by using the following equation:

$$\begin{bmatrix} V^1(0), V^1(7) \\ V^1(1), V^1(6) \\ V^1(2), V^1(5) \\ V^1(3), V^1(4) \end{bmatrix} = \frac{1}{2}\begin{bmatrix} a & c \\ -a & f \\ -a & -f \\ a & -c \end{bmatrix}\begin{bmatrix} T(0) \\ T(1) \end{bmatrix} \pm \frac{1}{2}\begin{bmatrix} e & d \\ -b & -g \\ g & -b \\ d & -e \end{bmatrix}\begin{bmatrix} T(2) \\ T(3) \end{bmatrix} =$$

$$\frac{1}{2}\begin{bmatrix} sla+slc \\ -sla+slb \\ -sla-slb \\ sla-slc \end{bmatrix} \pm \frac{1}{2}\begin{bmatrix} slf+slj \\ -sld-slh \\ slg-slk \\ sle-sli \end{bmatrix} = \frac{1}{2}\begin{bmatrix} s2c \\ -s2b \\ -s2a \\ s2d \end{bmatrix} \pm \frac{1}{2}\begin{bmatrix} s2g \\ -s2e \\ s2h \\ s2f \end{bmatrix}$$

wherein T(0)=X(4), T(1)=X(2), T(2)=X(5), and T(3)=X(3), and an input order of the primary multiplication is X(2), X(3), X(4), and X(5), wherein the cosine constants a, b, c, d, e, f, and g respectively correspond to the following:

$$[abcdefg] = \left[\cos\frac{\pi}{4}\cos\frac{\pi}{16}\cos\frac{\pi}{8}\cos\frac{3\pi}{16}\cos\frac{5\pi}{16}\cos\frac{3\pi}{8}\cos\frac{7\pi}{16}\right]$$

wherein 11 multipliers sla, slb, . . . , slk that are shared to perform the primary multiplication and the secondary multiplication respectively correspond to multipliers each having a different cosine constant:

$sla=a \times T(0)$, $slb=f \times T(1)$, $slc=c \times T(1)$, $sld=b \times T(2)$, $sle=d \times T(2)$, $slf=e \times T(2)$, $slg=g \times T(2)$, $slh=g \times T(3)$, $sli=e \times T(3)$, $slj=d \times T(3)$, and $slk=b \times T(3)$.

8. The IDCT device of claim 1, wherein the IDCT device is mounted to a video decoder for decoding an inputted video data and operated is at a same clock with the video decoder.

* * * * *